(12) United States Patent
Wright (10) Patent No.: US 9,956,911 B2
(45) Date of Patent: May 1, 2018

(54) OBJECT DETECTION FOR VEHICLES

(71) Applicant: Gentex Corporation, Zeeland, MI (US)

(72) Inventor: Thomas S. Wright, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days. days.

(21) Appl. No.: 14/790,030

(22) Filed: Jul. 2, 2015

(65) Prior Publication Data

US 2016/0001702 A1  Jan. 7, 2016

Related U.S. Application Data

(60) Provisional application No. 62/021,452, filed on Jul. 7, 2014.

(51) Int. Cl.
*G08G 1/16* (2006.01)
*B60Q 9/00* (2006.01)

(52) U.S. Cl.
CPC .................. *B60Q 9/008* (2013.01)

(58) Field of Classification Search
CPC .... B60Q 1/525; B60Q 9/008; B60R 25/1004; G08G 1/096716; G08G 1/16; G08G 1/165; G06F 17/00; G01S 7/527; G01S 15/931
USPC ........ 340/435, 426.1, 436, 905, 426.26, 901
See application file for complete search history.

(56) References Cited

U.S. PATENT DOCUMENTS

| | | | |
|---|---|---|---|
| 5,334,969 A | 8/1994 | Abe et al. | |
| 5,917,430 A | 6/1999 | Greneker, III et al. | |
| 6,265,968 B1 | 7/2001 | Betzitza et al. | |
| 7,403,101 B2 | 7/2008 | Kropinski et al. | |
| 7,570,155 B2 * | 8/2009 | Horii .................. | B60R 25/1004 340/426.1 |
| 8,766,846 B2 | 7/2014 | Kiehne | |
| 2001/0013835 A1 * | 8/2001 | Hsu .................. | B60Q 1/52 340/905 |
| 2005/0075770 A1 * | 4/2005 | Taylor .................. | B60Q 9/005 701/36 |
| 2005/0134441 A1 * | 6/2005 | Somuah .................. | B60Q 1/503 340/435 |
| 2005/0190048 A1 * | 9/2005 | Yagyu .................. | B60Q 5/005 340/435 |

(Continued)

OTHER PUBLICATIONS

International Search Report and Written Opinion of the International Searching Authority dated Oct. 15, 2015 for International Application No. PCT/US2015/039189, filed Jul. 6, 2015.

*Primary Examiner* — George Bugg
*Assistant Examiner* — Munear Akki
(74) *Attorney, Agent, or Firm* — Price Heneveld LLP; Bradley D. Johson (57) ABSTRACT

The present disclosure provides for a vehicle warning system. The warning system includes a sensor configured to detect a presence of a foreign object and a controller in communication with the sensor. The controller is operable to periodically communicate with the sensor to identify the presence of the foreign object while the vehicle is parked. The controller is further operable to output a warning signal in response to the presence of the foreign object. The warning signal is configured to communicate a detection of the foreign object having entered a path of the vehicle during a period while the vehicle is parked.

18 Claims, 4 Drawing Sheets

(56) References Cited

U.S. PATENT DOCUMENTS

| | | | |
|---|---|---|---|
| 2006/0167595 A1* | 7/2006 | Breed | B60R 21/01536 |
| | | | 701/1 |
| 2006/0176160 A1 | 8/2006 | Zoratti et al. | |
| 2007/0109104 A1* | 5/2007 | Altan | B60Q 9/008 |
| | | | 340/407.1 |
| 2008/0195273 A1 | 8/2008 | Matsuura et al. | |
| 2008/0204556 A1 | 8/2008 | de Miranda et al. | |
| 2010/0066534 A1* | 3/2010 | Takeichi | G01S 7/527 |
| | | | 340/540 |
| 2012/0310547 A1* | 12/2012 | Cristoforo | G08B 21/14 |
| | | | 702/24 |
| 2014/0168435 A1* | 6/2014 | Tuhro | B60Q 1/48 |
| | | | 348/148 |
| 2014/0207344 A1* | 7/2014 | Ihlenburg | E05F 15/73 |
| | | | 701/49 |
| 2015/0070156 A1* | 3/2015 | Milburn, Jr. | B60Q 9/008 |
| | | | 340/435 |

* cited by examiner

OBJECT DETECTION FOR VEHICLES

CROSS REFERENCE TO RELATED APPLICATIONS

This Application claims priority of U.S. Provisional Application No. 62/021,452, filed on Jul. 7, 2014, and the entirety of which is incorporated by reference herein.

TECHNOLOGICAL FIELD

The present disclosure relates generally to an object detection system and more particularly, relates to an advanced object warning system for a vehicle.

SUMMARY

One aspect of the present disclosure includes a vehicle warning system. The system comprises a sensor configured to detect a presence of a foreign object. A controller is in communication with the sensor. The controller is operable to periodically communicate with the sensor to identify the presence of the foreign object while the vehicle is idle. The controller is further operable to output a warning signal in response to the presence of the foreign object. The warning signal is configured to communicate a detection of the foreign object having entered a path of the vehicle.

In another aspect of the disclosure, a vehicle detection system for a vehicle idle state is disclosed. The system comprises a sensor configured to scan an area proximate the vehicle, at least one notification device, and a controller. The controller is in communication with the sensor and the notification device. The controller is operable to communicate with the sensor to identify a presence of a foreign object while the vehicle is parked. In response to the identification, the controller is configured to control the notification device to output a warning signal. The warning signal is configured to communicate the foreign object having entered a path of the vehicle during a period corresponding to the vehicle being parked.

In another aspect of the disclosure, a method for generating a vehicle operation alert corresponding to a detection of a foreign object having entered a path of the vehicle is disclosed. The method comprises scanning a detection area proximate the vehicle to generate scanning data during a temporal period of inactivity of the vehicle. A foreign object may be detected in the detection area based on the scanning data. Based on the scanning data a warning is generated in response to the detection of the foreign object. Based on the warning an alert is output corresponding to the warning.

These and other features, advantages, and objects of the present device will be further understood and appreciated by those skilled in the art upon studying the following specification, claims, and appended drawings.

DETAILED DESCRIPTION OF EMBODIMENTS

Figure 1:
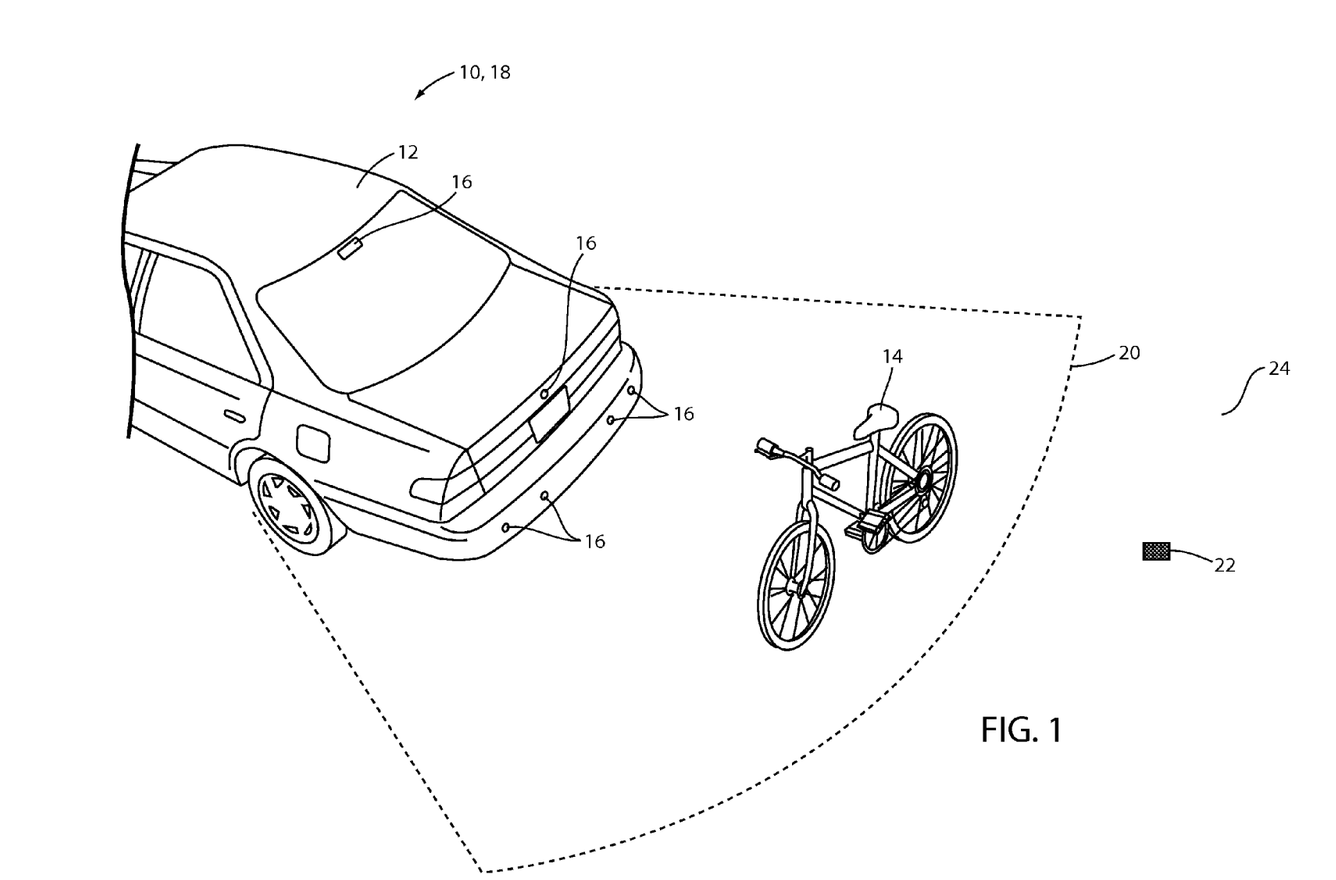
FIG. 1 is an environmental view of a system configured to detect a presence of a foreign object.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIG. 1, the disclosure provides for a warning system 10 to be utilized in a vehicle 12. The warning system 10 may be configured to provide an advanced warning to an operator of the vehicle 12 of a foreign object 14 located in a potential path of the vehicle 12. The system 10 comprises at least one sensor 16 configured to detect a presence of the foreign object 14. The sensor 16 is in communication with a controller 18. The controller 18 may be configured to periodically communicate with the sensor 16 to identify the presence of the foreign object 14 while the vehicle 12 is parked. In response to receiving a signal from the sensor, the controller 18 is configured to identify that the foreign object is present and output a warning signal.

The advanced warning, as discussed herein, provides the advantage that the operator of the vehicle 12 may be notified of the presence of the foreign object prior to becoming distracted by the various activities that may relate to operating the vehicle 12. For example, the warning system 10 is operable to provide the warning signal prior to the vehicle 12 being shifted into a drive gear. In this way, the warning system 10 may provide early warnings that may not be possible with conventional driver vision or assist systems. For example, a conventional rearview camera or warning system that is activated in response to a vehicle travelling in reverse may not provide an early warning as discussed herein.

The controller 18 may be configured to communicate with the sensor 16 to selectively activate a sensory function or scanning function of the sensor 16. In response to the sensory function, the sensor 16 is configured to output a detection signal. Based on the detection signal, the controller 18 is operable to identify whether the object 14 is present within a detection area 20 of the sensor 16. In response to identifying the object, the controller 18 may output the warning signal. The warning signal may be communicated to one or more notification devices and/or systems of the vehicle 12 to notify an operator of the vehicle 12 of the foreign object 14. The warning signal may notify the operator of a potential hazard to both the object 14 and the vehicle 12.

The warning system 10 may be configured to provide a temporally advanced or early warning to the operator of the vehicle 12 to help the operator of the vehicle 12 avoid the object 14. The controller 18 may be configured to activate the sensor 16 to scan the detection area 20 prior to an ignition sequence of the vehicle 12 being initiated, and/or prior to the vehicle 12 being shifted into a drive gear (e.g. reverse). In some implementations, the controller 18 is configured to activate the sensor 16 to scan the detection area 20 in response to a key fob 22 activating a keyless entry operation and/or coming in proximity of a keyless entry activation range 24.

By providing an early warning to the operator of the vehicle 12, the warning system 10 increases the likelihood that the operator may notice the warning signal. In contrast, a warning issued to the operator of the vehicle 12 after the vehicle 12 is started and/or is in motion may be less effective due to the operator being distracted. Distractions may include operating the vehicle 12 and common habitual preparations that the operator may consistently undertake during preparation to operate the vehicle 12. Some distractions may include buckling a seatbelt, correcting a radio station or volume of a stereo, adjusting a climate setting, adjusting a seating position, etc. The warning system 10 provides advanced notification to the operator to improve the likelihood that the operator of the vehicle 12 is not pre-occupied with distractions when a warning notification is delivered.

In some implementations, the controller 18 may be configured to scan the detection area 20 before and after operation of the vehicle 12. By scanning the detection area 20 when the vehicle 12 is initially parked, the controller 18 is operable to receive and store a signal and/or data from the sensor 16 for a later comparison. Later, the data received from the sensor 16, corresponding to when the vehicle 12 was parked, may be compared by the controller 18 to a signal and/or data requested from the sensor 16 corresponding to a later period of vehicle operation. In this way, the controller 18 may compare sensor data corresponding to the detection area 20 prior to a current operation of the vehicle 12 to detect the foreign object 14. The controller 18 may be operable to identify a change in the detection area 20 by identifying at least one foreign object 14 that was not present when the vehicle 12 was parked.

Following the detection of the foreign object 14, the system 10 may be configured to update the detection by verifying that the object 14 remains in the detection area 20. For example, once the foreign object 14 is detected, the controller 18 may periodically request updated data from the sensor 16 to determine if the object has moved from the detection area 20. For example, the controller 18 may update the detection of the foreign object 14 at a frequency of approximately one scan and update sequence of the detection area 20 every 0.1 seconds to 5 seconds. In this way, the system 10 is operable to update the advanced warning to remove an alarm condition and avoid false alarms due to the foreign object 14 being moved from the detection area 20.

In some implementations, the controller 18 may be configured to detect the foreign object 14 based on a signal and/or data received from the sensor 16 without a need for comparison to data recorded at an earlier time. In such implementations, the sensor 16 may be configured to communicate signals and/or data to the controller 18 that may be utilized by the controller 18 to identify the foreign object 14. The signal and/or data received from the sensor 16 may demonstrate at least one characteristic and/or value that may be identified by the controller 18 to detect the foreign object 14.

As illustrated in FIG. 1, the foreign object 14 is a bicycle. Though a bicycle is shown, the system 10 may be operable to detect any object that may interfere with a path of the vehicle 12 located in the detection area 20. The system 10 may be implemented using one or more sensors 16. The sensors 16 may comprise any form of sensors configured to scan the detection area 20. Some examples of sensors may include image sensors (or cameras), audio sensors, radar sensors, infrared sensors, ultrasonic sensors, lidar sensors, or other suitable sensors. The sensors 16 may be directed in any direction relative to the vehicle 12 and scan areas external to the vehicle 12. Any number of sensors may be included to expand or improve a detection of a foreign object in a detection area. Each of the sensors 16 may be in communication with the controller 18 such that the controller 18 is operable to monitor any number of areas external to the vehicle 12 for the foreign object 14.

Figure 2:
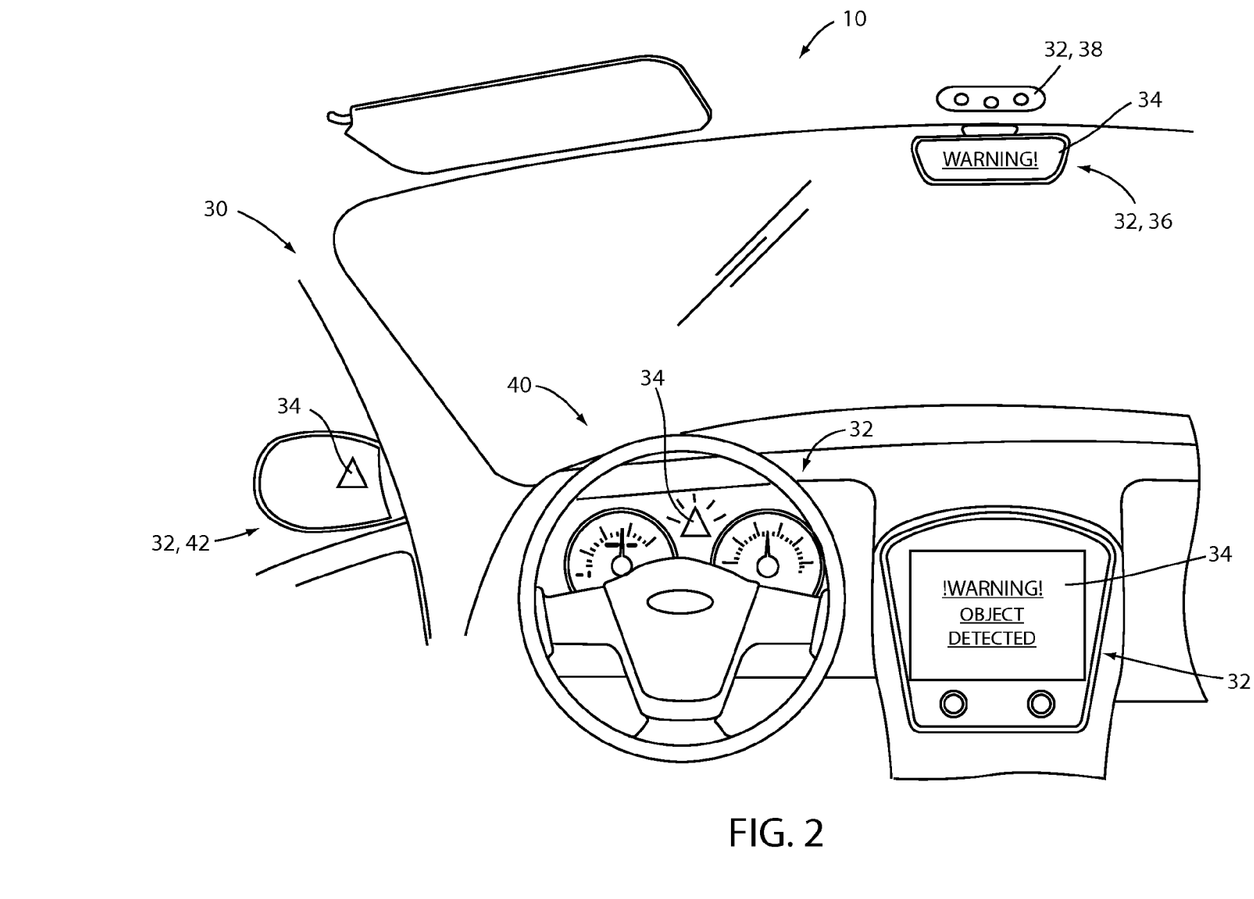
FIG. 2 is projected view of an interior of a vehicle demonstrating a notification device.

Referring to FIG. 2, a projected view of an interior 30 of the vehicle 12 is shown demonstrating a notification device 32. The notification device 32 may comprise a display and/or indicator 34. The indicator 34 is configured to convey a warning message or symbol to notify the operator that the object 14 is present in the detection area 20. The notification device 32 may correspond to a variety of vehicle accessories. Some accessories may include a rearview display device 36, an overhead console interface 38, a gauge cluster 40, a side mirror 42, and other various devices of the vehicle 12 configured to provide a notification to the operator.

The controller 18 may be operably coupled to and/or combined with one or more vehicle control systems in communication with the notification device 32. In some implementations the controller 18 may be disposed in the rearview display device 36 or any of the notification devices 32 discussed herein. The controller 18 is configured to output the warning signal to one or more of the notification devices 32 in response to the detection of the foreign object 14. Though the sensors 16 are demonstrated as components of the vehicle 12, the controller 18 may also be configured to communicate with remote sensors that are not physically connected to the vehicle 12.

Figure 3:
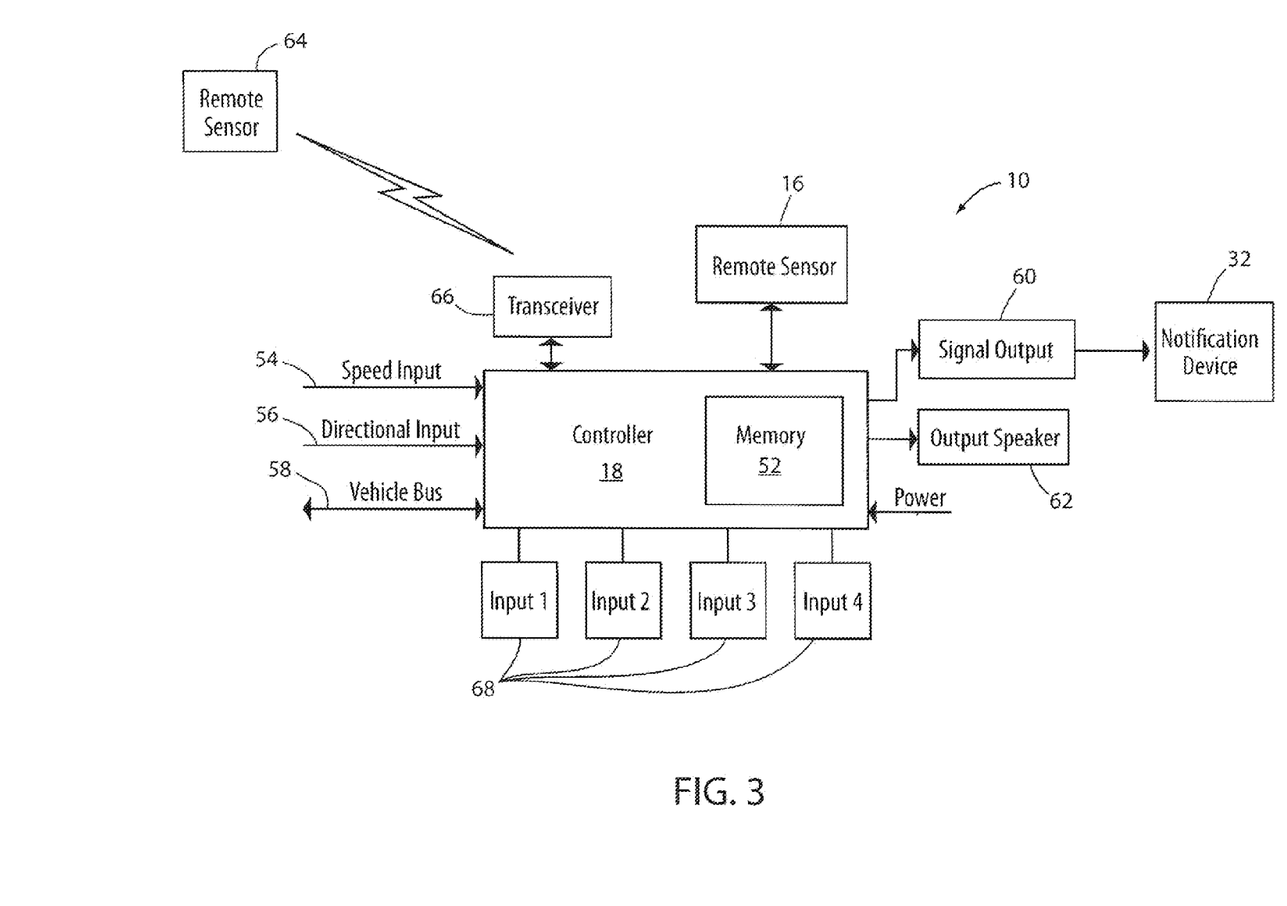
FIG. 3 is a block diagram of a system configured to detect a presence of a foreign object.

Referring now to FIG. 3, a block diagram of the system 10 is shown. The controller 18 may comprise one or more circuits and/or processors and a memory 52. The controller 18 may utilize the memory 52 to store data and/or signals received from the sensor 16 at a temporal period during which the vehicle 12 is parked. The data and/or signals stored in the memory 52 may later be utilized by the controller 18 to compare with updated data and/or signals measured in the detection area 20 after a temporal period has elapsed. The controller 18 may be configured to identify the foreign object 14 by identifying at least one difference in the data and/or signals that has changed over the temporal period. The controller 18 may also utilize one or more algorithms, comparisons, or any form of analysis to identify the foreign object directly from the data and/or signals received from the sensor 16 without a comparison to earlier recorded data.

In order to identify a timing to activate the sensor 16 to scan the detection area 20, the controller 18 may be in communication with a plurality of vehicle data inputs which may include a speed input 54, a directional input 56, and a vehicle bus 58. The controller 18 may utilize a speed input 54 and the directional input 56 to determine an operational state of the vehicle 12, for example if the vehicle 12 is in motion. The vehicle bus 58 may be utilized by the controller 18 to receive additional operational information for the vehicle 12 including a status of the ignition, the gear shifter, a locked/unlocked condition, etc. The controller 18 may further utilize the vehicle bus 58 to output a warning signal to one or more of the notification devices 32.

The controller 18 is in communication with the at least one sensor 16 and may selectively activate the sensor 16 to scan the detection area 20. In response to identifying the foreign object 14 in the detection area 20, the controller 18 is configured to output the warning signal via a signal output 60. The signal output 60 may communicate the warning signal to at least one notification device 32 to alert the operator of the vehicle 12 of the foreign object 14. The controller 18 may further be in communication with a speaker 62 and operable to output an audible alert in response to the detection of the foreign object 14. The audible alert may be output via any speaker in communication with the controller 18, for example an audio system of the vehicle 12.

In some implementations, the controller 18 is configured to communicate with at least one remote sensor 64 via a transceiver 66. The transceiver 66 may be configured to communicate with the remote sensor 64 via any suitable form of wireless communication. Some examples of wireless communication protocols may include: Radio Frequency (RF), private RF, Code Division Multiple Access (CDMA), Global System for Mobile communications (GSM), Universal Mobile Telecommunications System (UMTS), High-Speed Packet Access (HSPA), Evolution-Data Optimized (EV-DO), Long Term Evolution (LTE), Worldwide Interoperability for Microwave Access (Wi-MAX), IEEE 802.11 protocols (Wi-Fi), Bluetooth, or any other wireless protocol that facilitates wireless communications.

The controller 18 may also comprise a plurality of inputs 68. The inputs 68 may be configured to receive analog or digital signals, and in some implementations, may be configured to receive at least one user input via a switch. A user input may correspond to a command or instruction configured to control a system in communication with the controller via a wired or wireless connection (e.g. via the transceiver 66). The controller 18 may be in communication with and operable to control a variety of systems, for example vehicle systems and devices, lighting controls, security systems, "smart" power saving systems, etc.

In some implementations, the controller 18 may be configured as a component of or in communication with, a trainable control system, for example a HOMELINK® trainable control system. Such systems may be utilized to communicate with and/or control a wide range of devices. In operation, the trainable control system is operable to receive a control signal and program/learn the control signal to control an electronic device. For example, the trainable control system may be configured to learn and re-transmit one or more control signals configured to open/close a moving barrier, turn on/off lighting, activate/deactivate a security system, etc.

The trainable control system may utilize the transceiver 66 to communicate data corresponding to a variety of control devices. For example, the transceiver may be configured to control a garage door opener, remote home security system, lighting controller, etc. The controller 18 may be operable to communicate at least one control signal to a control device using a transmission frequency, data code, modulation scheme, or other signal characteristic corresponding to the control device. The control signal may be recognized by a receiving device (e.g. a garage door opener) to initiate a function of the receiving device.

Figure 4:
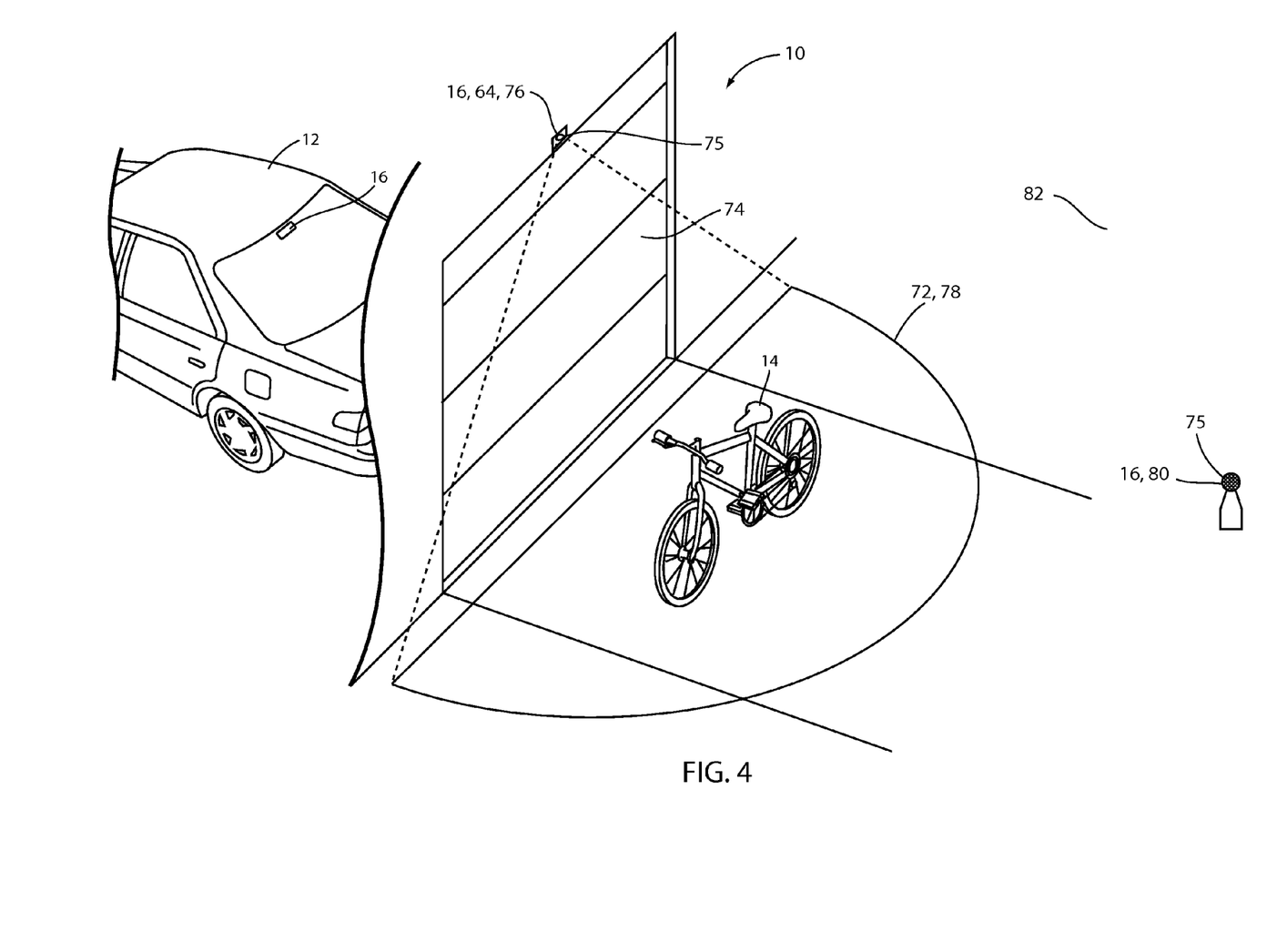
FIG. 4 is an environmental view of a system configured to detect a presence of a foreign object by utilizing at least one remote sensor.

Referring now to FIG. 4, an environmental view of the system 10 is shown. In some implementations, the system 10 is configured to detect a presence of a foreign object by utilizing the at least one remote sensor 64. As discussed herein, the controller 18 may be in communication with at least one remote sensor 64. The remote sensor 64 may be configured to scan a remote detection area 72 that is inaccessible to the local sensor 16. In this way, the system 10 is operable to detect the foreign object 14 even if the local sensor 16 is obstructed.

When the vehicle 12 is parked in a secure area, for example a garage 74, the local sensor 16 may be rendered ineffective to scan the detection area 20. However, with the controller 18 in communication with the remote sensor 64, the system 10 is operable to detect the foreign object 14 in the remote detection area 72. The detection of the foreign object 14 utilizing the remote sensor 64 may be completed similar to the detection with the local sensor 16 and may further utilize the transceiver 66 to wirelessly communicate with the remote sensor 64. As such, the disclosure provides for a flexible warning system that may be configured to detect at least one foreign object 14 in a variety of detection zones proximate the vehicle 12.

In some implementations, the controller 18 may be in communication with a plurality of remote sensors 75. As demonstrated in FIG. 4, a first remote sensor 76 may be configured to scan a first detection area 78. Also, a second remote sensor 80 may be configured to scan a second detection area 82. The remote sensors 75 may be utilized by the controller 18 independent of/or in combination with the local sensors 16. By providing for a detection of a foreign object 14 in a variety of locations both local to and remote from the vehicle 12, the disclosure provides various flexible and effective methods and systems to detect a foreign object and provide an advanced warning to an operator of a vehicle 12.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A vehicle warning system comprising:
    at least one sensor configured to detect a presence of a foreign object, wherein the at least one sensor comprises a remote detection device located in a remote location relative the vehicle, wherein the remote detection device is configured to detect the foreign object in the remote location obstructed from the vehicle;
    a controller in communication with the sensor, wherein the controller is operable to:
        control the sensor to complete a scan of a path of the vehicle for the foreign object; and
        output a warning signal in response to the foreign object being present, wherein the warning signal is configured to communicate the detection of the foreign object located in the path of the vehicle.

2. The warning system according to claim 1, further comprising:
a notification device in communication with the controller, the notification device configured to communicate information corresponding to the presence of the foreign object in the path of the vehicle.

3. The warning system according to claim 1, wherein the sensor corresponds to a vehicle reverse sensor.

4. The warning system according to claim 3, wherein the vehicle reverse sensor comprises at least one of an image sensor, an IR sensor, an ultrasonic sensor, and a magnetic sensor.

5. The warning system according to claim 1, wherein the remote detection device is configured to communicate wirelessly with the controller.

6. The warning system according to claim 5, further comprising:
a transceiver configured to provide for the communication between the controller and the remote detection device.

7. The warning system according to claim 1, wherein the controller is configured to periodically communicate with the sensor while an ignition of the vehicle is in an off condition.

8. A vehicle detection system for a vehicle idle state comprising:
a sensor configured to scan an area proximate the vehicle;
at least one notification device;
a controller in communication with the sensor and the notification device, wherein the controller is operable to:
communicate with the sensor to identify a presence of a foreign object while the vehicle is parked;
detect a key fob in proximity to the vehicle prior to a passenger accessing the vehicle;
in response to the detection of the key fob, control the sensor to complete a scan of the area; and
output a warning signal to the notification device in response to the presence of the foreign object, wherein the warning signal is configured to communicate a detection of the foreign object having entered a path of the vehicle during a period corresponding to the vehicle being parked.

9. The detection system according to claim 8, wherein the controller is further operable to control the sensor to periodically scan the area proximate the vehicle with the sensor to identify the presence of a foreign object during an idle period of the vehicle.

10. The detection system according to claim 8, wherein the controller is configured to detect the foreign object based on the scan and output a warning signal via at least one notification device in response to the detection of the foreign object.

11. The detection system according to claim 8, wherein the vehicle idle state corresponds to an ignition of the vehicle being inactive.

12. A method for generating a vehicle operation alert corresponding to a detection of the foreign object having entered a path of the vehicle, the method comprising:
scanning a first detection area proximate the vehicle to generate first scanning data during a temporal period of inactivity of the vehicle;
detecting a foreign object in the detection area based on the first scanning data;
scanning a second detection area to generate second scanning data during the temporal period of inactivity of the vehicle, wherein the second detection area is remote from the vehicle;
activating a warning condition in response to the detecting of foreign object in the first scanning data or the second scanning area;
in response to the vehicle entering an active state, inspecting the warning condition; and
outputting an alert in response to the warning status being active.

13. The method according to claim 12, wherein the warning is generated in response to at least one of an entry into the vehicle, an ignition sequence of the vehicle, a proximity detection of a key of the vehicle, and an unlocking operation of the vehicle.

14. The method according to claim 12, wherein the alert is output via at least one of a display device and a speaker.

15. The method according to claim 12, wherein the method further comprises periodically scanning the detection area during the period of inactivity to update the scanning data.

16. The warning system according to claim 1, wherein the at least one sensor comprises a plurality of sensors comprising a local detection device and the remote detection device.

17. The warning system according to claim 16, wherein the remote detection device is configured to detect the foreign object in a remote detection area inaccessible to the local detection sensor.

18. The method according to claim 12, wherein the scanning of the second detection area comprises scanning a region obstructed from the first detection area proximate the vehicle.

* * * * *

UNITED STATES PATENT AND TRADEMARK OFFICE
CERTIFICATE OF CORRECTION

PATENT NO. : 9,956,911 B2  
APPLICATION NO. : 14/790030  
DATED : May 1, 2018  
INVENTOR(S) : Wright

Page 1 of 1

It is certified that error appears in the above-identified patent and that said Letters Patent is hereby corrected as shown below:

In the Claims

Column 8, Claim 12, Line 20, after "of" insert --the--.

Signed and Sealed this  
Second Day of October, 2018

Andrei Iancu  
*Director of the United States Patent and Trademark Office*